US011858718B2

(12) United States Patent
Kimbrell et al.

(10) Patent No.: US 11,858,718 B2
(45) Date of Patent: Jan. 2, 2024

(54) DEVICE FOR STORING PILLS

(71) Applicant: Yali Design LLC, Raleigh, NC (US)

(72) Inventors: Jacob Warren Kimbrell, Raleigh, NC (US); Michael Pangilinan DiGruccio, Morrisville, NC (US)

(73) Assignee: Yali Design LLC, Raleigh, NC (US)

(*) Notice: Subject to any disclaimer, the term of this patent is extended or adjusted under 35 U.S.C. 154(b) by 0 days.

(21) Appl. No.: 17/565,577

(22) Filed: Dec. 30, 2021

(65) Prior Publication Data

US 2023/0211940 A1 Jul. 6, 2023

(51) Int. Cl.

| | |
|---|---|
| ***B65D 83/04*** | (2006.01) |
| ***B65D 47/20*** | (2006.01) |
| ***B65D 77/22*** | (2006.01) |
| ***A61J 1/03*** | (2023.01) |
| ***B65D 77/04*** | (2006.01) |

(52) U.S. Cl.

CPC ............ *B65D 83/0445* (2013.01); *A61J 1/03* (2013.01); *B65D 47/2012* (2013.01); *B65D 77/0426* (2013.01); *B65D 77/22* (2013.01); *B65D 2583/0409* (2013.01)

(58) Field of Classification Search

CPC ............ B65D 83/0445; B65D 47/2012; B65D 77/0426; B65D 77/22; B65D 2583/0409; B65D 51/28; A61J 1/03

USPC ....... 206/528, 530, 534, 538–540; 220/23.87

See application file for complete search history.

(56) References Cited

U.S. PATENT DOCUMENTS

| | | | | |
|---|---|---|---|---|
| 3,561,592 A | | 2/1971 | McCool | |
| 4,127,190 A | | 11/1978 | Sunnen | |
| 4,253,572 A | * | 3/1981 | Halbich | B65D 83/0445 220/524 |
| 4,288,006 A | | 9/1981 | Clover, Jr. | |
| D274,040 S | | 5/1984 | Ridgley | |
| D278,513 S | | 4/1985 | Ebeling et al. | |
| 4,583,667 A | * | 4/1986 | Fishman | B65D 47/263 222/142.6 |
| D451,666 S | | 12/2001 | Zastrow | |
| D463,102 S | | 9/2002 | Rosado et al. | |
| D488,618 S | | 4/2004 | Wekstein | |
| 7,147,127 B2 | * | 12/2006 | Lepke | B65D 83/0454 221/83 |
| D563,095 S | | 3/2008 | Sabbag | |
| 7,857,134 B2 | | 12/2010 | Koch | |
| 8,534,220 B1 | | 9/2013 | Olson | |
| D708,434 S | | 7/2014 | Deeb | |
| 8,915,371 B2 | * | 12/2014 | Giocastro | B65D 51/28 206/538 |
| 8,936,157 B1 | | 1/2015 | Xu et al. | |
| D821,738 S | | 7/2018 | Small | |
| D851,455 S | | 6/2019 | Lee | |
| 10,532,861 B2 | * | 1/2020 | Kimmel | B29C 66/43121 |
| D896,500 S | | 9/2020 | Natarajan et al. | |
| D901,166 S | | 11/2020 | Schepley et al. | |

(Continued)

*Primary Examiner* — Luan K Bui

(74) *Attorney, Agent, or Firm* — COATS & BENNETT, PLLC

(57) ABSTRACT

A device to store pills. The device includes different compartments each sized to hold one or more of the pills. The device is connected to a cap of a pill bottle. When the cap is attached to the pill bottle, the container is positioned in the interior space of the pill bottle. The cap may be safely secured to the pill bottle thus also safely securing the device within the interior of the pill bottle.

16 Claims, 6 Drawing Sheets

(56) References Cited

U.S. PATENT DOCUMENTS

| | | | | |
|---|---|---|---|---|
| D964,016 | S | 9/2022 | Chen | |
| D968,071 | S | 11/2022 | Li | |
| 2011/0278195 | A1* | 11/2011 | Giocastro | B65D 83/04 206/528 |
| 2013/0263424 | A1* | 10/2013 | Giocastro | B65D 51/28 29/428 |
| 2015/0008152 | A1* | 1/2015 | Xu | B65D 47/265 206/538 |
| 2019/0382172 | A1 | 12/2019 | Corey et al. | |
| 2022/0135292 | A1 | 5/2022 | Darst et al. | |

* cited by examiner

DEVICE FOR STORING PILLS

BACKGROUND

There are many circumstances in which a person takes medicine on a regular schedule, such as once a day, twice a day, etc. This requires the person to remember to take the medicine to maintain the schedule. The medicine can come in a variety of different forms, often including pill form. When the person takes their medicine, they remove the cap from the pill bottle, remove the required number of pills, and then take the medicine.

One issue with taking the medication is remembering to take the pills at the scheduled time. It is often difficult to remember when and if the medicine has been taken at a particular time and/or a particular day. A person who forgets whether they have taken their medicine may inadvertently take an additional dose. Conversely, a person who forgets whether they have taken their medicine may not take any medicine at the scheduled time. Neither of occurrences are acceptable because the person is not maintaining their schedule and either getting too much or not enough of the medicine.

Devices have been developed to assist a person with taking their medicine. One device includes a pill container with different compartments each sized to hold one or more pills. The person loads the medicine into each of the compartments which can correspond to the scheduled times. A drawback of these devices is they are separate from the pill bottle and can get misplaced or forgotten by the person. Another drawback is these are difficult to effectively lock to prevent another from taking the medication. For example, a child that gets the container can access and take the medicine.

SUMMARY

One aspect is directed to a device to store pills within an interior of a pill bottle. The device comprises a cap comprising a top and a sidewall that extends outward from an underside of the top and around a perimeter of the top. A container is mounted to the underside of the top and within the sidewall of the cap. The container comprises: an outer wall that extends around and forms an interior space; interior walls positioned in the interior space that divide the interior space into separate compartments; and a lid that extends over the interior space and comprises individual doors that align with the compartments with each of the lids being movable between open and closed positions. The container is configured to be positioned within the interior of the pill bottle when the cap is attached to the pill bottle.

In another aspect, the outer wall comprise a sidewall that extends axially away from the top of the cap and a bottom that is aligned in a plane that is parallel to the top of the cap.

In another aspect, the cap comprises a first circular sectional shape with a first diameter and the container comprises a second circular section shape with the first circular shape comprising a larger diameter than the second circular shape.

In another aspect, the cap and the bottle are coaxially aligned.

In another aspect, the container is attached with an adhesive to the underside of the cap.

In another aspect, a size of each of the compartments is the same.

In another aspect, the compartments comprise a substantially triangular shape.

In another aspect, the container comprises seven compartments.

In another aspect, a gap extends between the sidewall of the cap and the outer wall of the container with the gap having a constant width around an entirety of the container.

In another aspect, extensions extend outward from the sidewall of the cap and with the extensions being spaced away from the outer wall of the container to provide for the extensions to engage with the pill bottle when the cap is attached to the pill bottle.

In another aspect, the container extends axially outward beyond an end of the sidewall of the cap.

One aspect is directed to a device to store pills within an interior of a pill bottle. The device comprises a cap comprising a top, a sidewall that extends outward from an underside of the top and around a perimeter of the top, and extensions that extend outward from an inner side of the sidewall and are configured to engage with the pill bottle to secure the cap to the pill bottle. A container is mounted to the underside of the top. The container comprises: a cylindrical body with a sidewall, a closed first end, and an open second end with the cylindrical body forming an interior space and with the sidewall being spaced radially inward from and away from the extensions; interior walls positioned within the cylindrical body to divide the interior space into segregated compartments; and a lid positioned at the open second end with the lid comprising doors that are movable between open and closed positions wherein each one of the doors is positioned at one of the compartments. The container is configured to be positioned within the interior of the pill bottle when the cap is attached to the pill bottle.

In another aspect, the cap and the container are coaxially aligned.

In another aspect, the lid comprises a solid central section that is positioned away from the compartments and with each of the doors hingedly connected to the solid central section.

In another aspect, an extension extends outward from the closed first end and into the interior space of the container and a hollow post is positioned along the interior walls wherein the extension is positioned in the hollow post.

In another aspect, the container comprises seven of the compartments with each of the compartments having a common shape and size.

One aspect is directed to a method of dispensing a pill from a pill bottle, the method comprises: detaching a cap from the pill bottle; accessing a container that is attached to an underside of the cap with the container comprising a plurality of segregated compartments each sized to hold one or more of the pills; opening a door that extends over one of the compartments and removing one of the pills from the compartment; and reattaching the cap to the pill bottle with the container extending into an interior of the pill bottle.

In another aspect, the method further comprises reattaching the cap to the pill bottle and spacing the container away from a plurality of the pills that are positioned in a bottom section of the interior of the pill bottle In another aspect, the method further comprises reattaching the cap to the pill bottle and positioning the container within the interior space and away from walls of the pill bottle.

In another aspect, the method further comprises locking the container within the interior space of the pill bottle.

The features, functions and advantages that have been discussed can be achieved independently in various aspects or may be combined in yet other aspects, further details of which can be seen with reference to the following description and the drawings.

DETAILED DESCRIPTION

Figure 1:
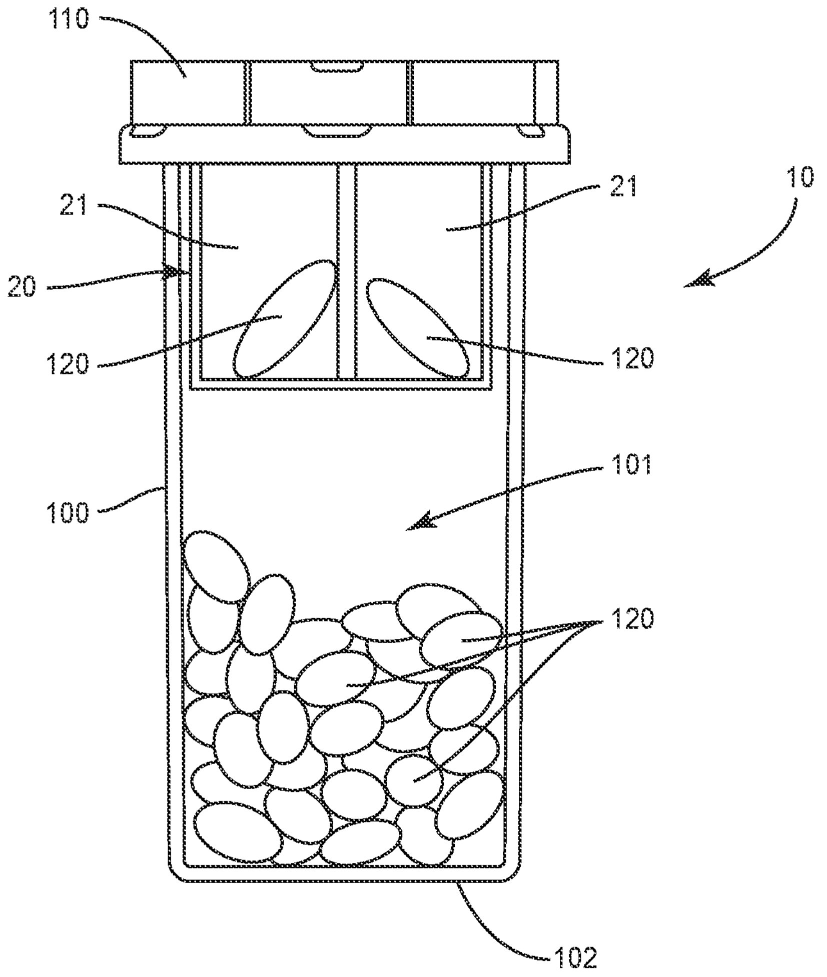
FIG. 1 is a side view of a device attached to a pill bottle.

FIG. 1 illustrates a device 10 configured to be attached to a pill bottle 100. The device 10 includes a container 20 that is attached to an underside of a cap 110. The cap 110 is configured to attach to the pill bottle 100 and enclose an interior space 101 formed within the pill bottle 100 and sized to hold pills 120. The container 20 includes two or more segregated compartments 21 each sized to hold one or more of the pills 120. The device 10 is configured such that the container 20 is positioned within the interior space 101 when the cap 110 is attached to the pill bottle 100. The container 20 is sized relative to the pill bottle 100 to be spaced away from the bottom 102 to allow for additional pills 120 to be contained within the interior space 101.

The term "pill bottle" is used broadly herein to define a container with an interior space configured to hold pills 120. The pill bottle 100 includes an opening that leads into the interior space 101. The pill bottle 100 can include various shapes and sizes and can be constructed from a variety of materials, including but not limited to glass and plastic.

The term "pill" is used herein is broadly defined as an item that is ingested by a person. Pills 120 can include various shapes and sizes and can include various forms including but not limited to tablets, capsules, and soft-gels. The pills 120 can include various substances, including but not limited to prescription medication, over-the-counter medication, herbal supplements, and vitamins.

Figure 2:
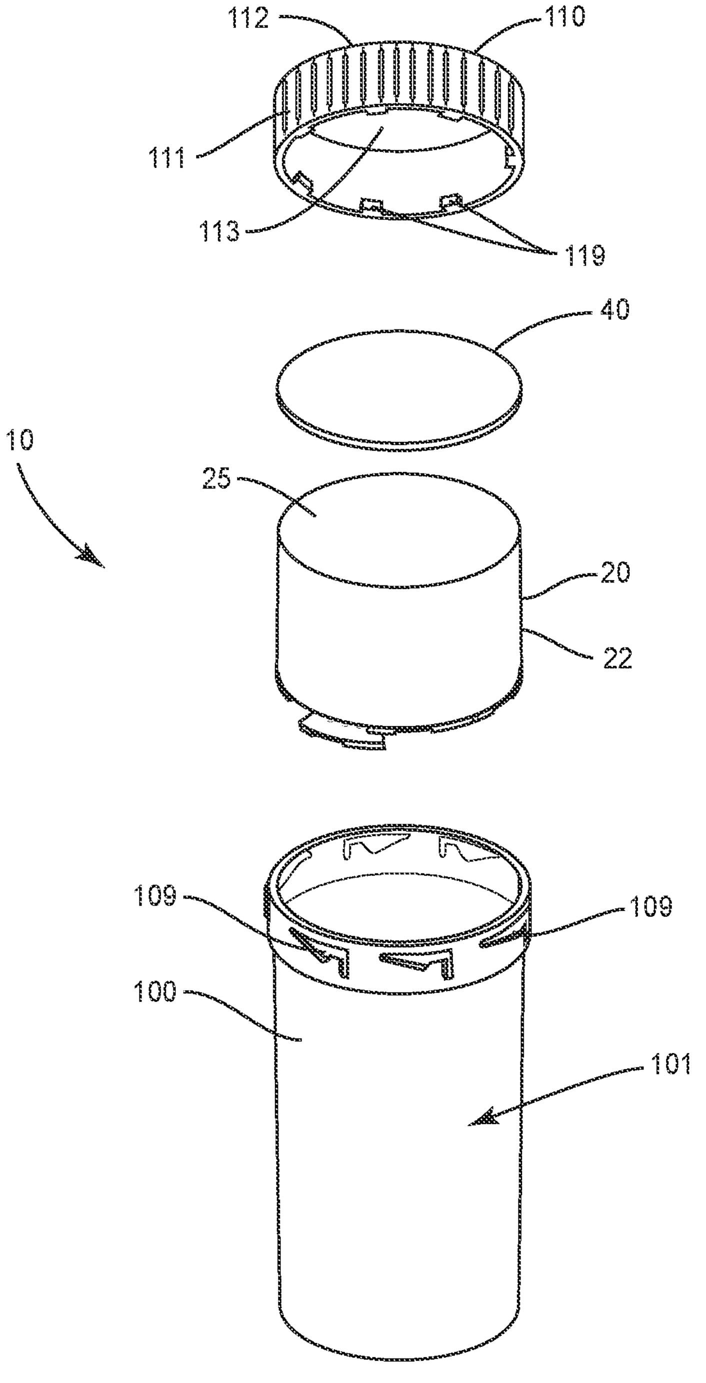
FIG. 2 is an exploded view of the device and the pill bottle of FIG. 1.

FIG. 2 illustrates an exploded view of a device 10 configured to be used with a pill bottle 100. The device 10 includes a container 20 that is attached to an underside 113 of a cap 110. The cap 110 is configured to be removably attached to the pill bottle 100 and includes a top 112 that extends over the open end of the pill bottle 110 and sidewalls 111 that extend outward from the perimeter of the top 112 and engage with the pill bottle 100. An adhesive 40 attaches the container 20 to the underside 113 o the cap 112. The container 20 is aligned at the center of the underside 113.

In one example, the container 20 and the cap 110 are co-axially aligned. The container 20 includes a cylindrical shape with an outer wall 22 that is spaced away from the sidewall 111 of the cap 110. This spacing provides for engagement features on the cap 110 and pill bottle 100 to engage together to secure the cap 110 to the pill bottle 100.

Figure 3:
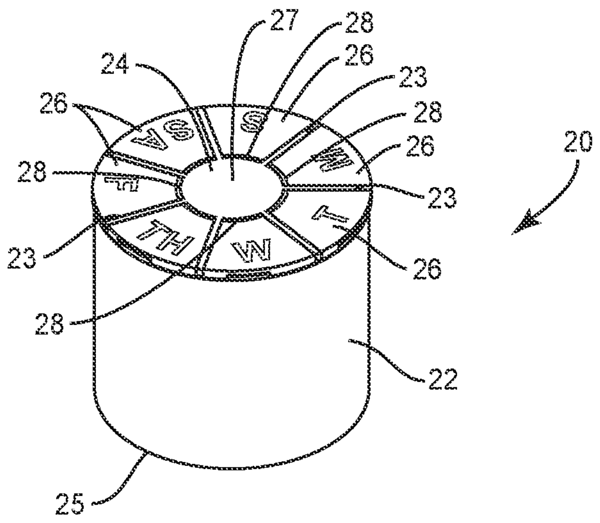
FIG. 3 is a perspective view of a container.

FIG. 3 illustrates the container 20 removed from the cap 110. The container 20 includes the outer wall 22 and a lid 24. The container 20 includes a circular sectional shape that corresponds to the circular shape of the cap 110. In this example, both the outer wall 22 and the lid 24 include circular sectional shapes. In one example, the outer wall 22 includes a bottom wall 25 that extends across the bottom edge of the sidewall 22 and closes the bottom section of the container 20. This prevents the pills 120 from escaping if there were any gaps formed between the outer wall 22 and the cap 110. In another example, the outer wall 22 is open at the bottom of the container 20. The container 20 is attached to the cap 110 that closes the bottom side of the container 20.

The lid 24 extends across the top of the outer wall 22. When the container 20 is attached to the cap 110, the lid 24 faces away from the cap 110. The lid 24 includes doors 26 that are movable between open and closed positions. A door 26 is positioned over each of the compartments 21. In the open position, the doors 26 are pivoted open with one end spaced from the compartments 21 to allow a pill 120 to be inserted and/or removed from the respective compartment 21. In the closed position, the doors 26 extend over and prevent the pill 120 from being inserted and/or removed from the respective compartment 21.

In one example, each of the compartments 21 includes the same shape and size. In another example, two or more have different shapes and/or sizes. In one example, the compartments 21 have a substantially triangular shape with a width that tapers outward towards the outer wall 22. The inner radial edge may not taper to a point and thus the shape is not a true triangle. In one example, the container 20 includes seven compartments 21 that corresponding to the days of the week. Each of the compartments 21 has the same shape and size.

The lid 24 also includes a central section 27. Each of the doors 26 is pivotally connected at a hinge 28 to the central section 27. This connection provides for the doors 26 to move between the open and closed positions and also remain attached to the lid 24. In one example, the hinge 28 is formed by a section of the lid 24 with a reduced thickness. In another example, the hinge 28 is formed by a crease in the lid 24. In one example, the lid 24 is formed as a single, unitary piece. In one specific example, the lid 24 is formed as a single molded piece. In another example, the lid 24 is formed by two or more separate pieces.

In one example, the bottom 25 of the container 20 is aligned in a plane that is parallel with a plane of the lid 24. In one example, the bottom and the lid 24 are perpendicular to the outer wall 22.

Figure 4:
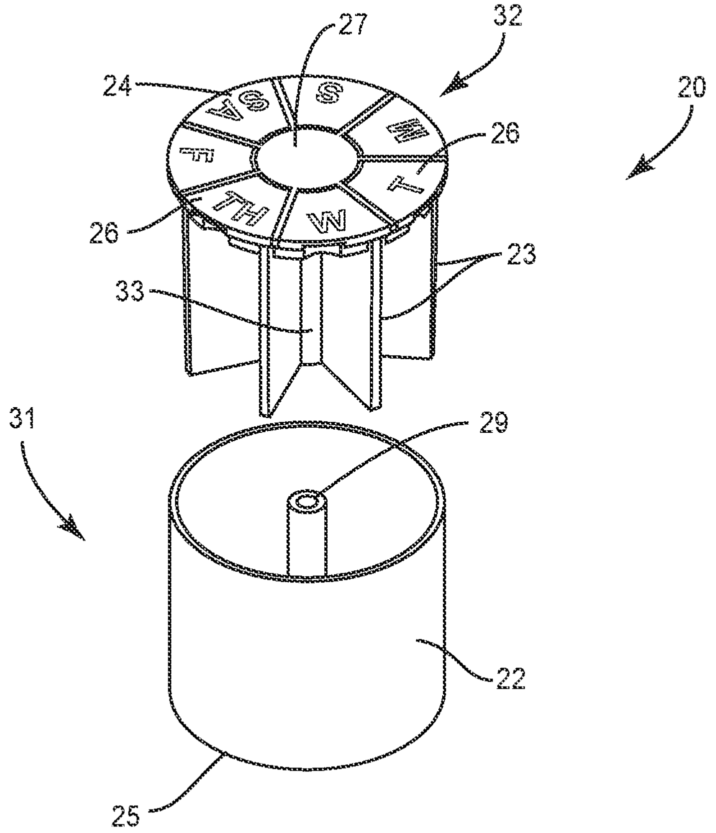
FIG. 4 is an exploded perspective view of a container that includes first and second sections.

FIG. 4 illustrates an exploded view of the container 20 with a first section 31 that includes the outer wall 22 and a second section 32 that includes the lid 24 and interior walls 23. The first section 31 includes the outer wall 22 that has a sidewall 22 and a bottom wall 25. The first section 31 forms a cavity with an open end. An extension 29 extends upward from the bottom wall 25 within the cavity. In one example, the extension 29 extends from the center of the bottom wall 25. The extension 29 can include various heights relative to the sidewall 22, with one example including the extension 29 recessed below a top edge of the sidewall 22.

The second section 32 includes the interior walls 23 and the lid 24. In one example, the second section 32 is formed from a single, unitary piece that includes both of the interior walls 23 and lid 24. In another example, the second section 32 is formed from two or more separate pieces that are connected together.

In one example, the doors 26 are constructed from a transparent material for a person to view into the compartment 21. In another example, the doors 26 are opaque.

Figure 5:
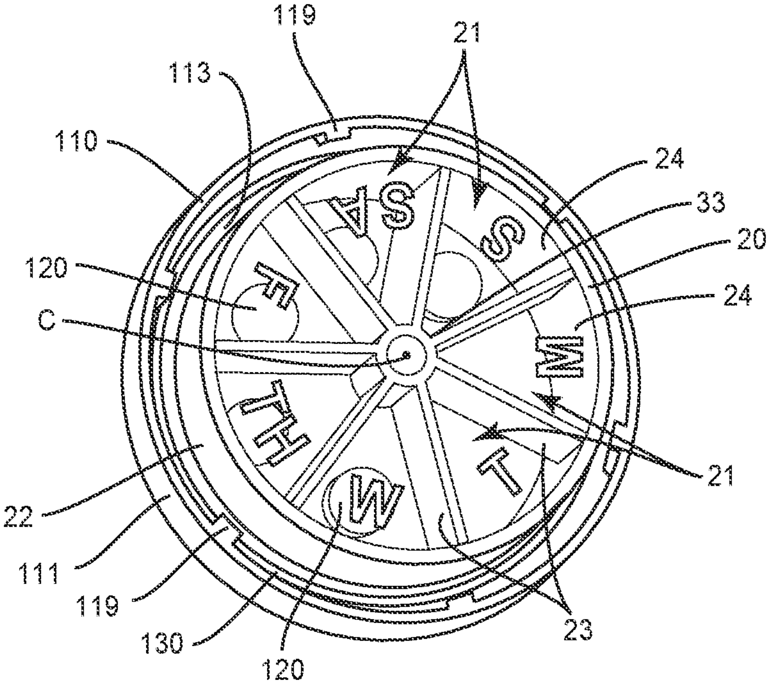
FIG. 5 is a perspective view of a container attached to an underside of a cap.
Figure 6:
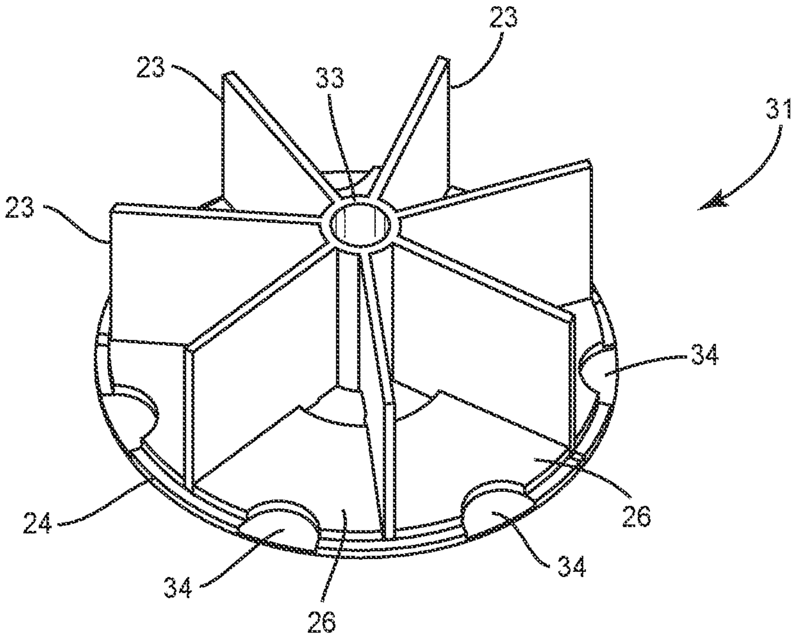
FIG. 6 is a perspective view of a first section of a container that includes a lid and interior walls.

As illustrated in FIGS. 5 and 6, the second section 32 includes a central post 33 with a hollow interior. The post 33 is sized to extend around and receive the extension 29 when the second section 32 is inserted into the first section 31. In one example, the post 33 is aligned at a center of the lid 24 and aligns with the centrally aligned extension 29. The interior walls 23 extend radially outward from the post 33. The interior walls 23 define the separate compartments 21 that hold the pills 120.

In one example, the bottom edges of the post 33 and interior walls 23 are aligned in a plane and contact against the bottom wall 25 of the first section 31. Further, the radial ends of the interior walls 23 are sized to abut against the sidewall of the first section 31. This abutting positioning segregates the compartments 21 and prevents the pills 120 from escaping.

As illustrated in FIG. 5, the container 20 is positioned within the sidewall 111 of the cap 110. A gap 130 is formed between the sidewalls 22, 111. In one example, the gap 130 has a constant width around the entirety of the container 20. In one example, each of the container 20 and the cap 110 are coaxially aligned along an axis that extends through a center point C.

The gap 130 provides for extensions 119 on the inner sides of the sidewalls 111 of the cap 110 to engage with extensions 109 (see FIG. 2) on the outer side of the pill bottle 100. The extensions 109, 119 mate together to secure the cap 110 to the pill bottle 100. In one example, the extensions 109, 119 provide for the cap 110 to be locked onto the pill bottle 100 requiring corresponding axial and twisting forces to unlock. This configuration is often referred to as a childproof lock. This locking feature provides for the container 20 to be secured within the interior space 101 of the pill bottle 100 when the cap 110 is attached. In another example, the extensions 109, 119 include threads that engage together to thread the cap 110 onto the pill bottle 100.

Figure 7:
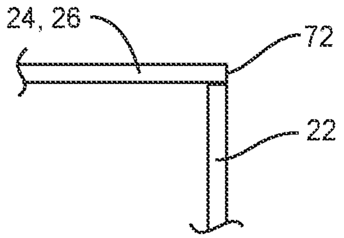
FIG. 7 is a partial side view of a lid positioned relative to a sidewall of a container.

In one example, the lid 24 is aligned with or positioned inward from the edge of the sidewall 22 of the container 20. This positioning prevents the lid 24 from contacting against the sidewall 22 or otherwise interfering with the cap 110 attaching to the pill bottle 100. FIG. 7 illustrates a partial side view of the lid 24, and specifically a door 26 of the lid 24 positioned relative to the sidewall 22 of the container 20. An outer edge 72 of the lid 24 is aligned with or recessed inward from the outer edge of the sidewall 22. In one example, the lid 24 is positioned on the top edge of the sidewall 22 as illustrated in FIG. 7. In another example, the lid 24 is positioned with the outer edge 72 abutting against the inner side of the sidewall 22. This abutting positioning provides for a friction fit for the doors 26 of the lid 24 to remain in the closed position until opened by the person.

Figure 8:
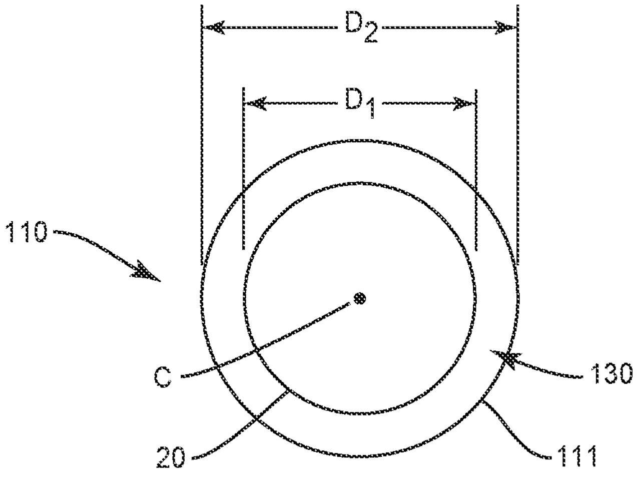
FIG. 8 is a schematic diagram of a container positioned within a footprint of a pill bottle.

FIG. 8 schematically illustrates the container 20 positioned within the sidewall 111 of the cap 110. The container 20 and cap 110 each include circular sectional shapes that are coaxially aligned on a center point C. The container 20 includes a diameter D1 that is smaller than a diameter D2 of the cap 110. This difference in sizes provides for the gap 130 that extends between the container 20 and the side of the cap 110.

In use, the device 10 is removed from the pill bottle 100. One or more pills 120 are stored in one of more of the compartments 21. The respective doors 26 of the lid 24 are than secured over the compartments 21. The device 10 is then secured to the pill bottle 100 by inserting the container 20 into the interior space 101 of the pill bottle 100. The cap 110 is then secured to the bottle 100, such as by engaging together the corresponding extensions 109, 119. The secure attachment between the cap 110 and the pill bottle 100 also securely positions the container 20 within the interior space 101 of the pill bottle 100. The container 20 is positioned in the interior space 101 with the top edge facing into the pill bottle 100. The size of the interior space 101 provides for space for additional pills 120 to be stored.

When a person needs to take a pill 120, the cap 110 is removed from the pill bottle 100, such as by rotating and/or applying a removal force. The cap 110 and attached container 20 are removed from the pill bottle 100 thus providing access to the container 20. The person can then open the appropriate door 26 and access the one or more pills 120 stored in the corresponding compartment 21.

Figure 9:
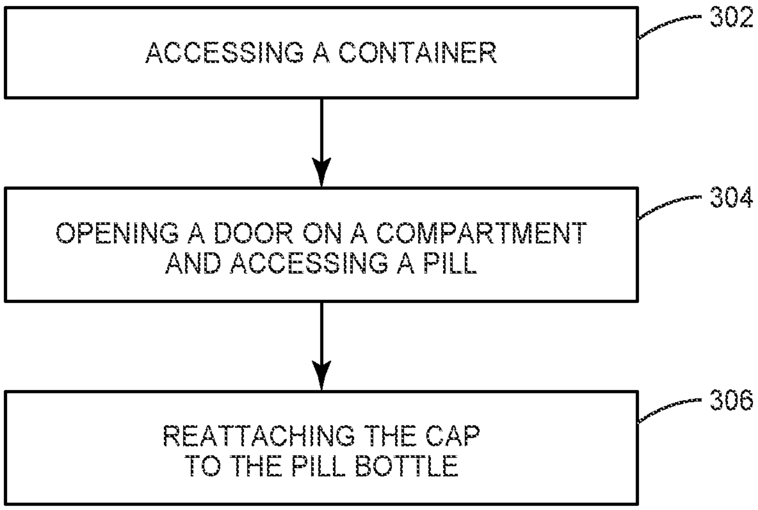
FIG. 9 is a flowchart diagram of a method of dispensing a pill from a pill bottle.

FIG. 9 illustrates a method of dispensing a pill 120 from a pill bottle 100. The method includes detaching the cap 110 from the pill bottle 100 (step 300). The method also includes accessing a container 20 that is attached to an underside of the cap 110 (step 302). The container 20 includes segregated compartments 21 each sized to hold one or more of the pills 120. The method includes opening a door 26 that extends over one of the compartments 21 and removing one of the pills 120 from the compartment 21 (step 304). The method includes reattaching the cap 110 to the pill bottle 100 with the container 20 extending into an interior space 101 of the pill bottle 100 (block 306).

The container 20 can be attached to the cap 110 in a variety of manners. In one example, an adhesive 40 attaches the container 20. Other examples include but are not limited to mechanical fasteners and a threaded connection. In one example, the container 20 does not include an adhesive 40 as the container 20 is directly connected to the cap 110. In another example, the container 20 and cap 110 are integrally made as a unitary, single-piece construction. In one specific example, the container 20 and the cap 110 have a single, molded construction.

In one example, the container 20 is attached to a bottom side of the cap 110 and is positioned within the interior space 101 of the pill bottle 100 when the cap 110 is attached to the pill bottle 100. In another example, the container 20 is attached to a top side of the cap 110. In this example, the container 20 is positioned outside of the interior space 101 and is accessible when the cap 110 is attached to the pill bottle 100.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive.

The invention claimed is:

1. A device to store pills within an interior of a pill bottle, the device comprising:

a cap comprising a top and a sidewall that extends outward from an underside of the top and around a perimeter of the top;

a container mounted to the underside of the top and within the sidewall of the cap, the container comprising:

an outer wall that extends around and forms an interior space;

interior walls positioned in the interior space that divide the interior space into separate compartments;

a lid that extends over the interior space and comprises individual doors that align with the compartments, each of the doors being movable between open and closed positions;

the container configured to be positioned within the interior of the pill bottle when the cap is attached to the pill bottle.

2. The device of claim 1, wherein the outer wall comprises a sidewall that extends axially away from the top of the cap and a bottom that is aligned in a plane that is parallel to the top of the cap.

3. The device of claim 1, wherein the cap comprises a first circular sectional shape with a first diameter and the container comprises a second circular section shape with the first circular shape comprising a larger diameter than the second circular shape.

4. The device of claim 3, wherein the cap and the bottle are coaxially aligned.

5. The device of claim 1, wherein the container is attached with an adhesive to the underside of the cap.

6. The device of claim 1, wherein a size of each of the compartments is the same.

7. The device of claim 6, wherein each of the compartments comprises a substantially triangular shape.

8. The device of claim 7, wherein the container comprises seven compartments.

9. The device of claim 1, further comprising a gap that extends between the sidewall of the cap and the outer wall of the container with the gap having a constant width around an entirety of the container.

10. The device of claim 1, further comprising extensions that extend outward from the sidewall of the cap and with the extensions being spaced away from the outer wall of the container to provide for the extensions to engage with the pill bottle when the cap is attached to the pill bottle.

11. The device of claim 1, wherein the container extends axially outward beyond an end of the sidewall of the cap.

12. A device to store pills within an interior of a pill bottle, the device comprising:

a cap comprising:

a top;

a sidewall that extends outward from an underside of the top and around a perimeter of the top;

extensions that extend outward from an inner side of the sidewall and are configured to engage with the pill bottle to secure the cap to the pill bottle;

a container mounted to the underside of the top, the container comprising:

a cylindrical body with a sidewall, a closed first end, and an open second end, the cylindrical body forming an interior space and with the sidewall being spaced radially inward from and away from the extensions;

interior walls positioned within the cylindrical body to divide the interior space into segregated compartments;

a lid positioned at the open second end, the lid comprising doors that are movable between open and closed positions, wherein each one of the doors is positioned at one of the compartments;

the container configured to be positioned within the interior of the pill bottle when the cap is attached to the pill bottle.

13. The device of claim 12, wherein the cap and the container are coaxially aligned.

14. The device of claim 12, wherein the lid comprises a solid central section that is positioned away from the compartments and with each of the doors hingedly connected to the solid central section.

15. The device of claim 12, further comprising:

an extension that extends outward from the closed first end and into the interior space of the container;

a hollow post positioned along the interior walls;

wherein the extension is positioned in the hollow post.

16. The device of claim 12, wherein the container comprises seven of the compartments with each of the compartments having a common shape and size.

* * * * *